W. CLEWELL.
Ice-Cream Measure and Mold.
No. 209,751. Patented Nov. 12, 1878.
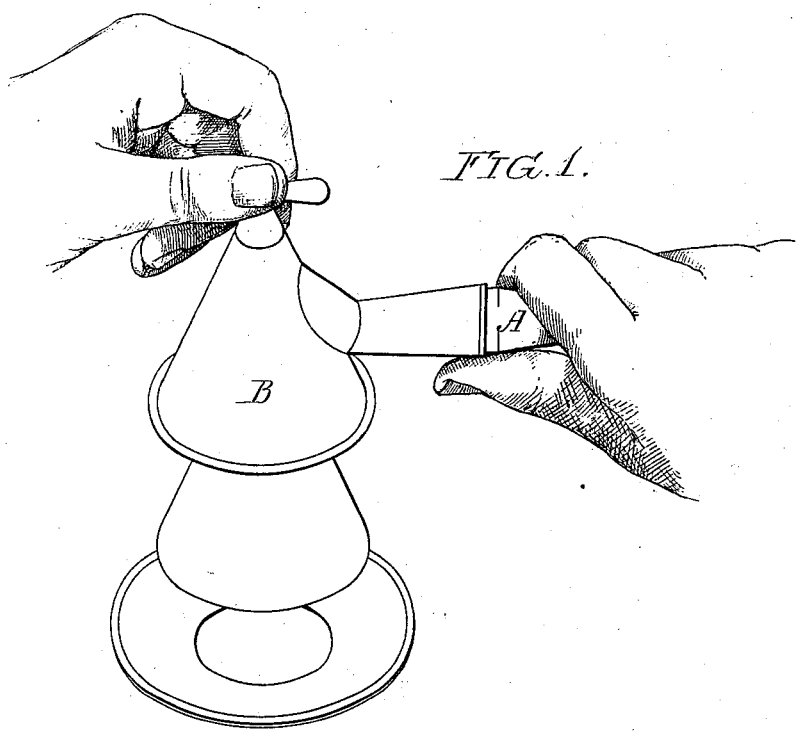
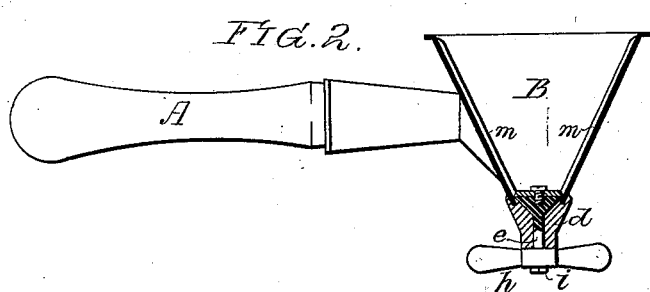
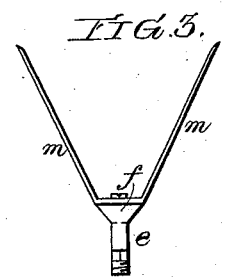
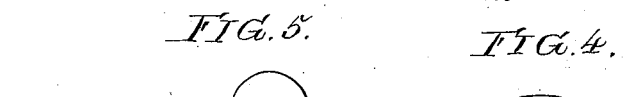
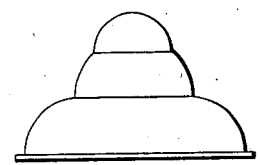
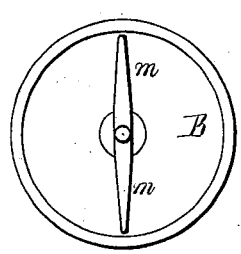
Witnesses
Henry Howson Jr.
Harry Smith
Inventor
William Clewell
by his Attorneys
Howson and Son
N. PETERS, PHOTO-LITHOGRAPHER, WASHINGTON, D. C.

UNITED STATES PATENT OFFICE.

WILLIAM CLEWELL, OF READING, PENNSYLVANIA.

IMPROVEMENT IN ICE-CREAM MEASURE AND MOLD.

Specification forming part of Letters Patent No. 209,751, dated November 12, 1878; application filed April 29, 1878.

*To all whom it may concern:*

Be it known that I, WILLIAM CLEWELL, of Reading, Pennsylvania, have invented a new and useful Improvement in Ice-Cream Measure and Mold, of which the following is a specification:

The object of my invention is to provide retailers of ice-cream with an implement for measuring the same and for depositing it on a plate or saucer in a molded and attractive condition.

In the accompanying drawing, Figure 1 is a perspective view illustrating the implement and the mode of using the same; Fig. 2, a sectional view; Fig. 3, a detached view of part of Fig. 2; Fig. 4, a view of the open end of the measure; and Figs. 5 and 6, views showing modified forms of the measure.

To a suitable handle, A, is secured the measure B, which consists of a tapering vessel, made in the present instance of thin metal, the small end of the vessel being secured to a metal base, $d$, through which passes a spindle, $e$, having a conical head, $f$, adapted to a countersunk recess in the said base, to which the spindle is confined by its handle $h$ and a nut, $i$. To the head of the spindle are attached two arms or scrapers, $m\, m$, which bear against the measure in the interior of the same.

In using the implement, it is held in one hand, with the mouth of the measure uppermost, as in Fig. 2, and by a spoon held in the other hand the vessel is filled with ice-cream to its upper edge, the cream being properly smoothed off to this edge. The implement is then inverted and held above a plate or saucer, as shown in Fig. 1, while the handle $h$ is turned, thereby causing the arms to detach the frozen cream from the sides of the measure, the mass of cream then falling onto the plate, ready for presentation to the consumer, in a molded and attractive condition.

It is not essential that the measure should be of the conical form represented in Figs. 1 and 2. It may, for instance, be made in the form shown in Figs. 5 and 6, or in any other form which will permit the free escape of the mass of frozen cream, the scraping-arms being in all cases made to conform with the shape of the measure. Neither is it necessary that the vessel should be made of metal, as glass, china, or other like material might in some cases be deemed desirable.

It will be evident that more than two scraping-arms may be used, and that one only would serve the desired purpose; but I prefer two arms.

I claim as my invention—

1. The combination of the measuring-vessel B, having a suitable handle, with a scraping arm or arms adapted to the said vessel, and admitting of being turned therein, all substantially as set forth.

2. The combination of the measuring-vessel A, the spindle $e$, passing through and arranged to turn in the said vessel, and carrying a scraping arm or arms, $m$, with a handle, $h$, secured to the spindle, all substantially as described.

In testimony whereof I have signed my name to this specification in the presence of two subscribing witnesses.

WILLIAM CLEWELL.

Witnesses:
   MATTHIAS MENGEL,
   J. W. EDES.